(12) United States Patent
Carlson et al.

(10) Patent No.: US 9,646,149 B2
(45) Date of Patent: May 9, 2017

(54) ACCELERATED APPLICATION AUTHENTICATION AND CONTENT DELIVERY

(71) Applicant: Microsoft Corporation, Redmond, WA (US)

(72) Inventors: Drew Carlson, Redmond, WA (US); Martin Calsyn, Barcelona (ES); Alexander Angriawan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 546 days.

(21) Appl. No.: 14/271,253

(22) Filed: May 6, 2014

(65) Prior Publication Data

US 2015/0326577 A1 Nov. 12, 2015

(51) Int. Cl.
| | |
|---|---|
| G06F 21/00 | (2013.01) |
| G06F 21/45 | (2013.01) |
| H04L 29/06 | (2006.01) |
| H04L 9/32 | (2006.01) |
| G06F 21/33 | (2013.01) |

(52) U.S. Cl.
CPC ............ *G06F 21/45* (2013.01); *G06F 21/335* (2013.01); *H04L 9/32* (2013.01); *H04L 9/3271* (2013.01); *H04L 29/06* (2013.01); *H04L 63/083* (2013.01); *H04L 63/0884* (2013.01); *H04L 63/101* (2013.01)

(58) Field of Classification Search
CPC ..... G06F 21/45; G06F 21/335; H04L 63/101; H04L 9/32; H04L 29/06; H04L 63/083; H04L 63/0884; H04L 9/3271
See application file for complete search history.

(56) References Cited

U.S. PATENT DOCUMENTS

| | | | |
|---|---|---|---|
| 6,934,697 B1 | 8/2005 | Warren | |
| 7,283,135 B1 * | 10/2007 | Cote | ...................... G06T 19/00 345/419 |
| 8,473,749 B1 | 6/2013 | Madsen et al. | |
| 8,584,042 B2 | 11/2013 | Erol et al. | |
| 2004/0030615 A1 * | 2/2004 | Ling | ................. G06Q 30/0277 705/14.73 |
| 2010/0287467 A1 | 11/2010 | Sylthe et al. | |
| 2011/0202988 A1 | 8/2011 | Otranen et al. | |

(Continued)

OTHER PUBLICATIONS

Nadeau, Charles, "Using OAuth authentication with your application", Published on: Jun. 27, 2013, Available at: https://support.zendesk.com/entries/24458591-Using-OAuth-authentication-with-your-application.

(Continued)

*Primary Examiner* — Kendall Dolly
(74) *Attorney, Agent, or Firm* — Turk IP Law, LLC (57) ABSTRACT

A samples service is configured to provide accelerated application authentication and content delivery. A proof of identity of a client application is exchanged with credentials that are used to authenticate the client application to a content provider. Samples of documents from the content provider are selected based on a contextual information of the client application to provide it with customized content. Static data associated with the samples are provided instead of dynamic data that is resource intensive to generate.

17 Claims, 7 Drawing Sheets

(56) References Cited

U.S. PATENT DOCUMENTS

| | | | | |
|---|---|---|---|---|
| 2012/0084804 A1* | 4/2012 | Simmons | ......... | H04N 21/25816 |
| | | | | 725/28 |
| 2012/0089901 A1* | 4/2012 | Collins | .............. | H04N 1/00244 |
| | | | | 715/234 |
| 2014/0033279 A1 | 1/2014 | Nimashakavi et al. | | |
| 2014/0090040 A1* | 3/2014 | Abuelsaad | .......... | H04L 63/0823 |
| | | | | 726/7 |
| 2014/0214856 A1* | 7/2014 | Mahkovec | ........ | G06F 17/30073 |
| | | | | 707/747 |

OTHER PUBLICATIONS

"Yammer Developers—Authentication", Published on: Oct. 27, 2012, Available at: http://developer.yammer.com/authentication/.

"About Client Capabilities", Published on: Apr. 21, 2011, Available at: http://msdn.microsoft.com/en-us/library/ms531077(v=vs.85).aspx.

* cited by examiner

ACCELERATED APPLICATION AUTHENTICATION AND CONTENT DELIVERY

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications render content from external providers through a display. The applications allow users to access and interact with content that is unavailable locally.

Users are frequently disrupted by authentication demands of content providers. Multiple content providers necessitate multiple authentication schemes to interact with variety of content associated with a workflow of a consumer. Furthermore, authentication sessions are subject to de-authentication as a result of timeout periods. Substantial disruptions in the workflow negate a positive user experience with the content and any application that is used to render the content.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing accelerated application authentication and content delivery. In some example embodiments, a samples service may exchange a proof of identity of a client application with credentials that may be used to authenticate the client application to a content provider. Samples of documents from the content provider may be selected based on a contextual information associated with the client application to provide the client application with customized content. Static data associated with the samples may be provided as a replacement for dynamic data associated with the samples to minimize use of resource expensive operations in generation of the dynamic data.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, accelerated application authentication and content delivery may be provided by a samples service. A proof of identity of a client application may be exchanged with credentials that may be used to authenticate the client application to a content provider. Samples of documents from the content provider may be selected based on a contextual information of the client application to provide it with customized content. Static data associated with the samples may be provided instead of dynamic data that is resource intensive to generate.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide accelerated application authentication and content delivery. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

Figure 1:
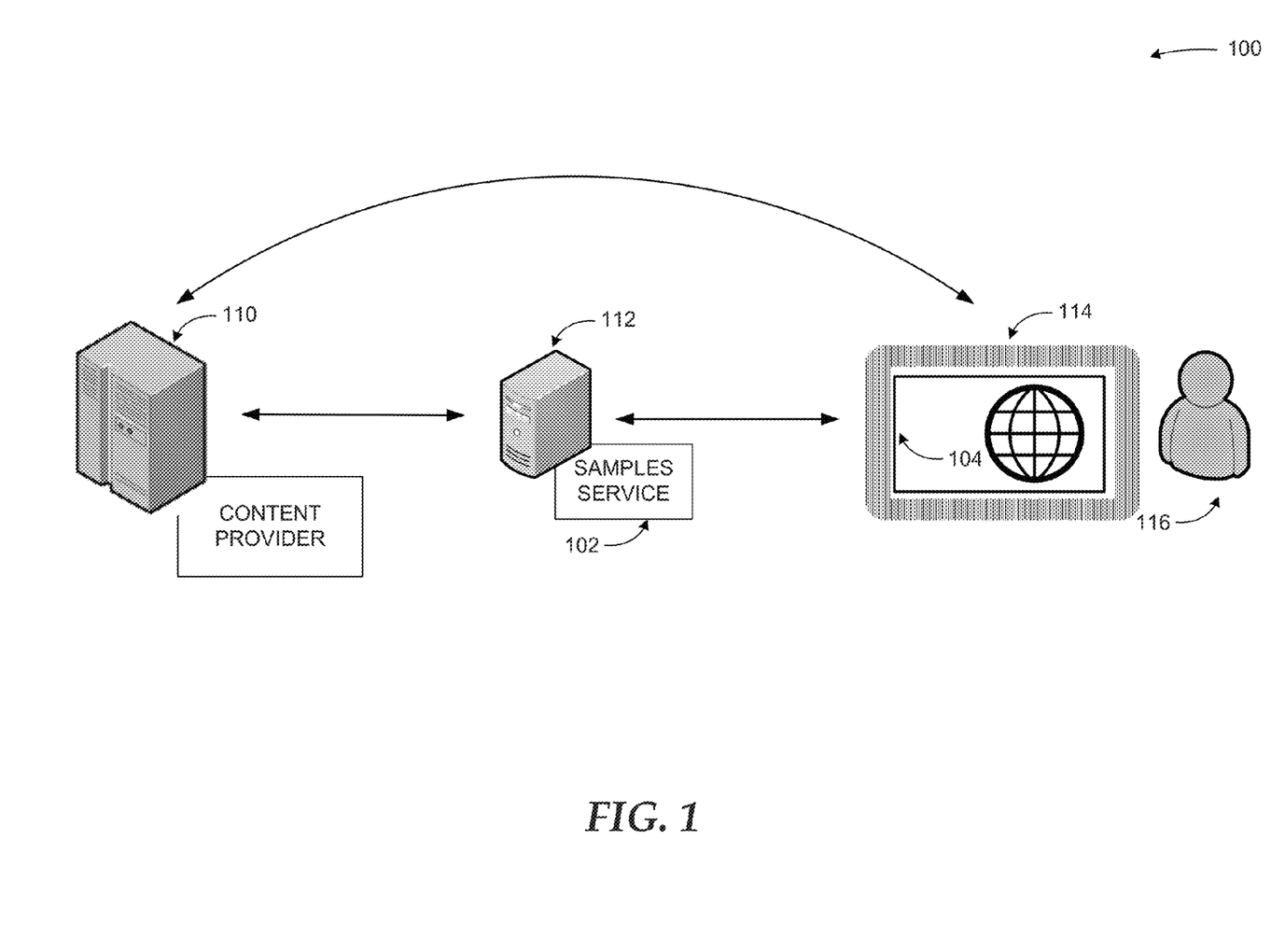
FIG. 1 is a conceptual diagram illustrating an example samples service providing accelerated application authentication and content delivery, according to embodiments.

FIG. 1 is a conceptual diagram illustrating an example samples service providing accelerated application authentication and content delivery, according to embodiments.

As shown in diagram 100, a samples service 102 may provide authentication and content delivery functions to mediate communications between a client application 104 of a client device 114 and a content provider 110. The client device 114 may include a computing device with a display configured to render content to a user 116. The client device 114 may be configured to accept input from the user 116 such as a touch based input, a keyboard based input, a mouse based input, a gesture based input, an audio based input, a pen based input, and similar ones. In addition, the content provider 110 may include one or more servers that provide content such as documents, images, video, audio, and similar ones to the client application 104. Furthermore, the samples service 102 may be executed in a server 112. Alternatively, the samples service 102 may be provided by the content provider 110 as an authentication and content delivery interface for the client application 104.

The client device 114 may execute the client application 104 to render content from the content provider 110. The rendered content may be consumed by the user 116. The user 116 may manage the client application 104 to request the content from the content provider 110. However, authentication schemes of the content provider 110 may disrupt a content consumption workflow of the user 116. The samples service 102 may automate authentication of the client application 104 to the content provider 110. The samples service 102 may exchange a proof of identity provided by the client application 104 with credentials to allow the client application 104 to authenticate to the content provider 110. In addition, the samples service 102 may customize content from the content provider 110 with contextual information from the client application 104. Furthermore, a dynamic data of the content from the content provider 110 may be replaced with static data to minimize resource consumption while generating the content to provide to the client application 104.

While the example system in FIG. 1 has been described with specific components including the samples service 102 that provides an accelerated authentication and content delivery scheme, embodiments are not limited to these components or system configurations and can be implemented with other system configuration employing fewer or additional components.

Figure 2:
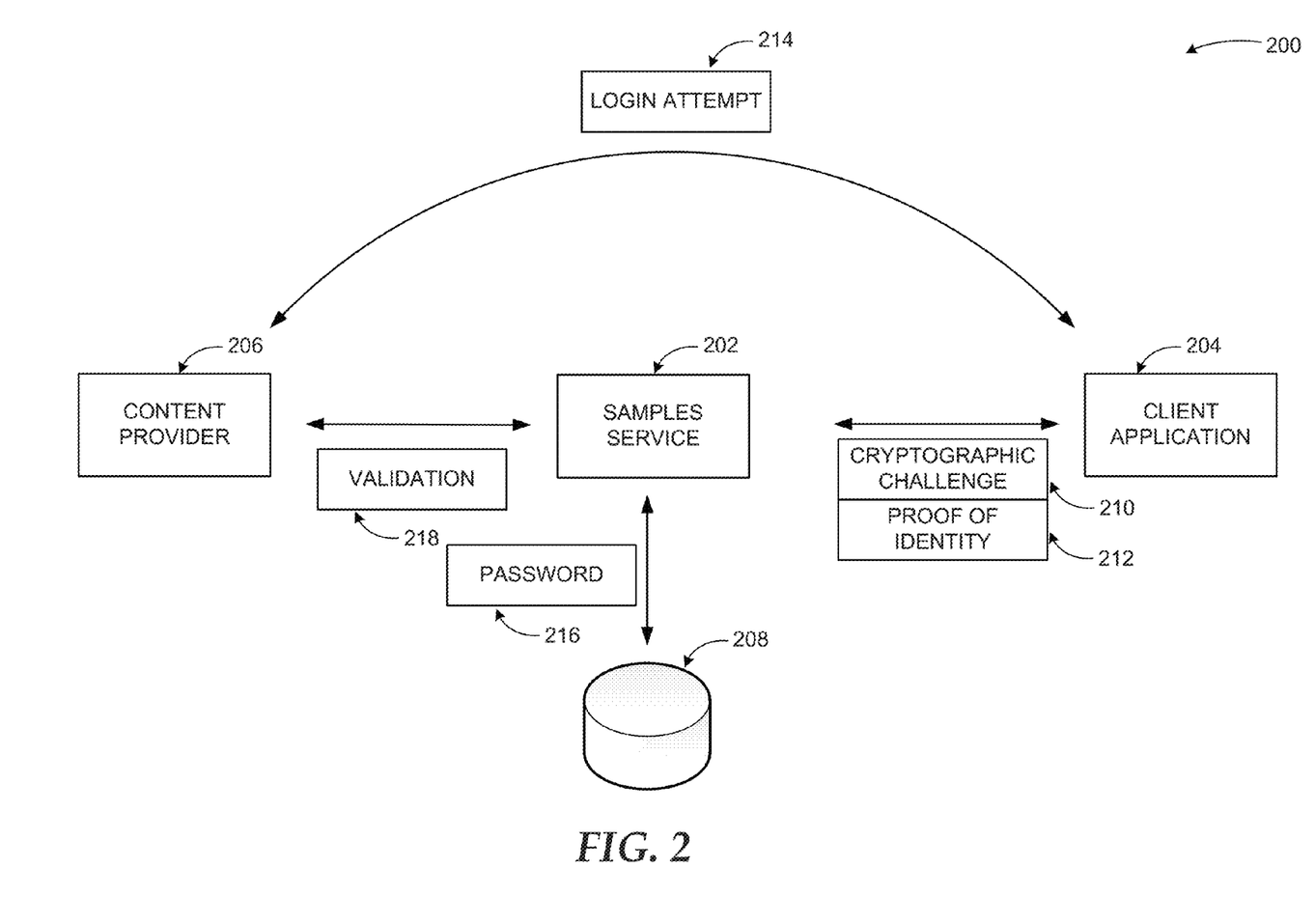
FIG. 2 illustrates an example of exchanging a proof of identity with credentials to authenticate a client application to a content provider, according to embodiments.

FIG. 2 illustrates an example of exchanging a proof of identity with credentials to authenticate a client application to a content provider, according to embodiments.

As shown in diagram 200, an example scheme is provided to authenticate a client application 204. The client application 204 may initiate an authentication contact with a samples service 202. The authentication contact may be a communication to retrieve content from a content provider 206. The communication may include authentication elements. The samples service 202 may intercept the authentication contact and transmit a cryptographic challenge 210 to the client application 204. The cryptographic challenge 210 may be a communication to request the client application 204 to prove its identity. The client application 204 may prove its identity by transmitting a proof of identity 212.

The samples service 202 may receive the proof of identity 212 and a request for credentials from the client application 204. The client application 204 may transmit the request for credentials to receive credentials from the samples service 202 in order to authenticate the client application 204 to the content provider 206. The proof of identity 212 may include the cryptographic challenge 210 and a cryptographic information associated with the client application 204. The cryptographic information may be an information that identifies the client application 204 and is unique to the client application 204. An example may include a serial number of the client application 204.

The samples service 202 may create a password 216 for a username of the content provider 206 in response to a validation 218 of the proof of identity 212. The samples service 202 may validate the proof of identity 212 through the content provider 206. The content provider 206 may validate an authentication associated with the client application 204 using the proof of identity 212. Alternatively, the proof of identity 212 may be validated through a trusted authentication provider managing authentication schemes associated with the content provider 206. An example may include checking the proof of identity 212 against validated identifications stored by the trusted authentication provider.

The username may be a placeholder for an account of the content provider 206. The account may be privileged to access content of the content provider 206. The password 216 associated with the username may be stored in a table maintained by a trusted cloud host 208. New passwords may be generated and stored in the table based on number of authentication attempts by the client application 204. An authentication of the client application 204 may expire based on a time period that is configurable by the content provider 206 or the samples service 202.

The username and the password 216 may be transmitted as the credentials to the client application 204 to allow the client application 204 to authenticate to the content provider 206. The samples service 202 may intercept a login attempt 214 by the client application 204 to authenticate to the content provider 206 with the credentials. The credentials may include the username and the password 216. The login attempt 214 may be redirected to a security token service (STS). The STS may be separate service from the samples service 202. Alternatively, the STS may be a component of the samples service 202.

A request security token (RST) may be received from the client application 204 at the STS along with the login attempt 214. The RST may be used to request a security token. In response to receiving the RST, the password 216 may be validated. In an example scenario, the password 216 may be validated to confirm that the password 216 is stored in the table of the trusted cloud host 208. In response to validating the password 216, the password 216 may be removed from the table maintained by the trusted cloud host 208 to invalidate a subsequent use of the password 216. Next, a request security token response (RSTR) may be transmitted to the client application 204 to allow the client application 204 to authenticate to the content provider 206 using the RSTR.

Figure 3:
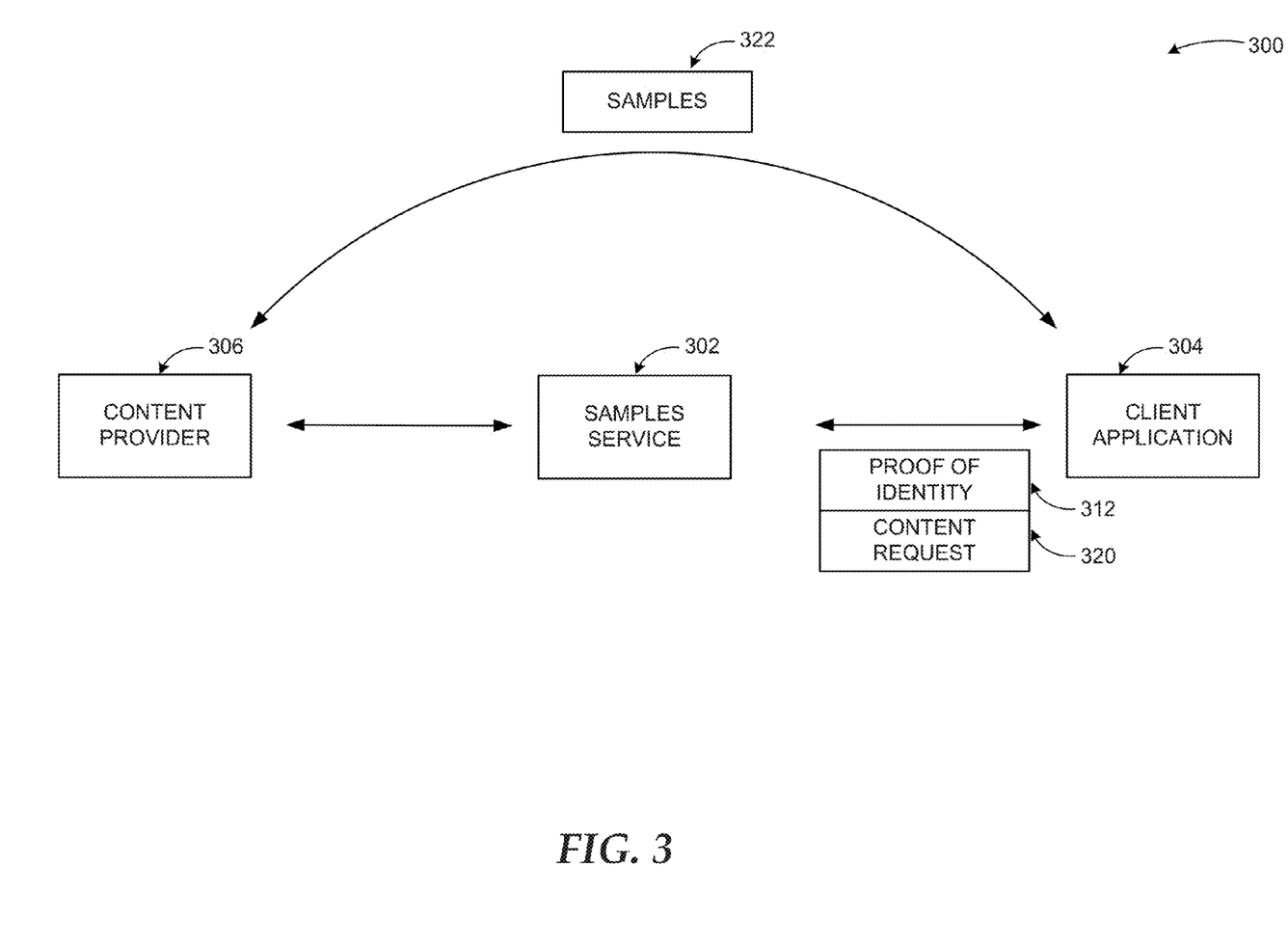
FIG. 3 illustrates an example of generating samples of documents from a content provider to provide a client application with customized content, according to embodiments.

FIG. 3 illustrates an example of generating samples of documents from a content provider to provide a client application with customized content, according to embodiments.

As shown in diagram 300, a samples service 302 may receive a content request 320 for content from a client application 304 along with a proof of identity 312. The proof of identity 312 may be used to authenticate the client application 304 to a content provider 306 as discussed in relation to FIG. 2. The content request 320 may be determined to include a version of the client application 304 and a content history of previous samples of content consumed by the client application 304. Samples 322 may include documents consumed by the client application 304.

The samples service 302 may select the samples 322 of the content to deliver to the client application 304. Selection of the samples 322 may include combining a version of the client application 304, a content history of the previous samples consumed by the client application 304, and a historic information associated with the client application 304 as a contextual information of the client application 304 that is used to determine the samples 322. The version of the client application 304 may be used to filter the content provided by the content provider 306 to a subset of the content that is capable of being rendered by the version of the client application 304. The content history may be used to determine a subset of the content that is similar to the previous samples referred to by the content history. The historic information may be used to determine one or more trends associated with a subset of the content that is retrieved by the client application 304. The one or more trends may be analyzed to determine the subset for selection as the samples 322.

The samples service 302 may also analyze a contextual information of the client application 304. The contextual information may include a product type of the client application 304, a version of the client application 304, a geo-location of the client application 304, or resource loads associated with the content provider 306 that may be used to determine the samples 322. In an example scenario, a subset of the content that is capable of being rendered by the product type of the client application 304 may be selected as the samples 322. In addition, a subset of the content associated with the geo-location of the client application 304 may be selected as the samples 322. Furthermore, a subset of the content that is capable of being rendered by the version of the client application 304 may be selected as the samples 322. In another example scenario, the resource loads of physical and virtual resources of the content provider 306 may be compared against thresholds. A subset of the content that is associated with physical and virtual resources below the thresholds may be selected as the samples 322.

In addition, the samples 322 may be delivered to the client application 304. The content provider 306 may directly deliver the samples 322. Alternatively, the content provider 306 may transmit the samples 322 through the samples service 302. Furthermore, a list of samples 322 may be constructed from the samples 322. The list may be stored at the client application 304 to allow the client application 304 to locate the samples 322 at the content provider 306 in order to download additional information associated with the samples 322.

Figure 4:
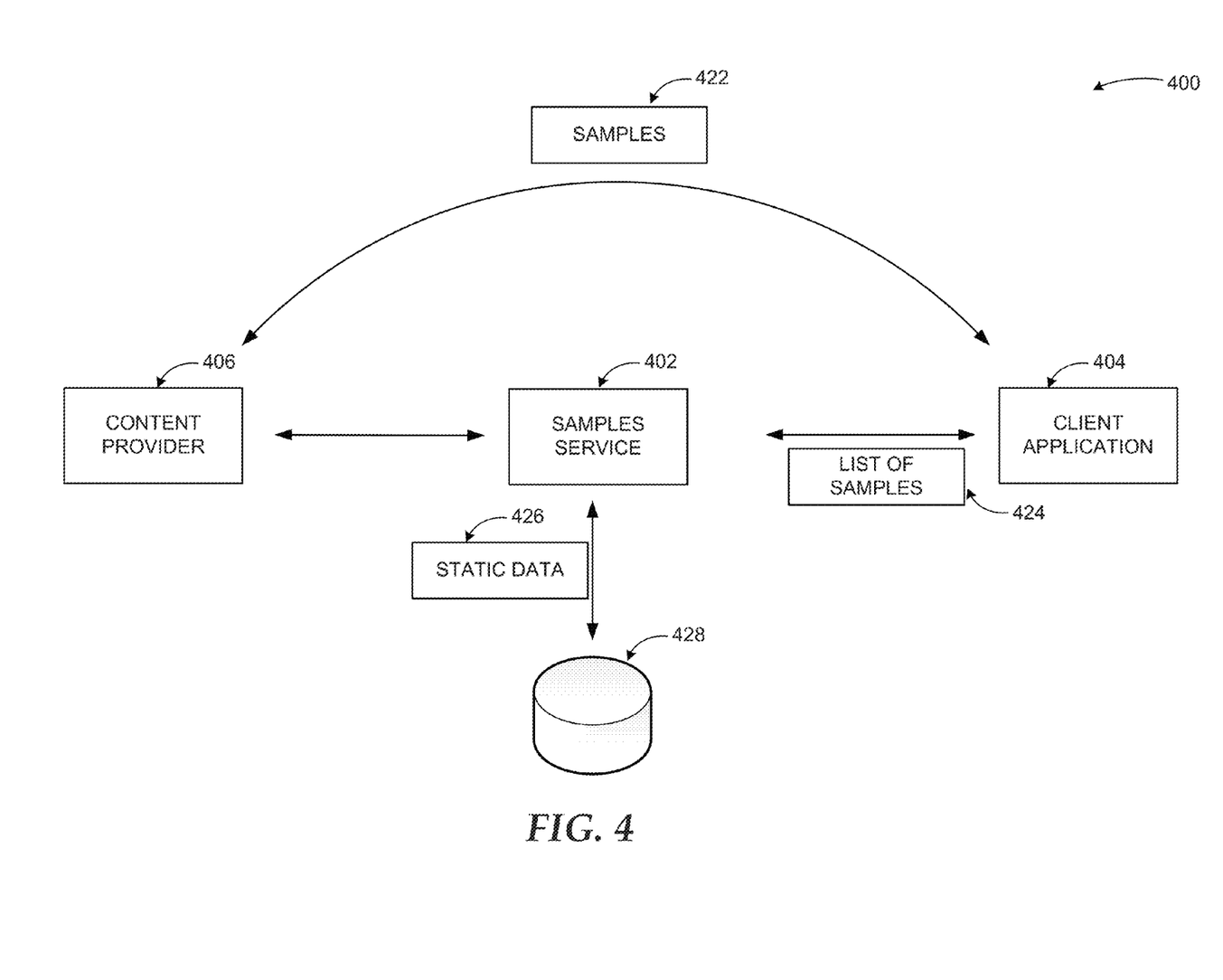
FIG. 4 illustrates an example of providing static data associated with content that is provided to minimize generation of resource expensive dynamic data, according to embodiments.

FIG. 4 illustrates an example of providing static data associated with content that is provided to minimize generation of resource expensive dynamic data, according to embodiments.

As shown in diagram 400, a samples service 402 may capture a static data 426 from samples 422 of content from a content provider 406. The static data 426 may include thumbnail images of documents associated with the samples 422, elements of the documents or metadata that describe internal structures of the documents. The static data 426 may be stored in a trusted cloud host 428. The trusted cloud host 428 may be an application, a service, a server, a computing device, and similar host that may be privileged to interact with the content provider 406 and the samples service 402.

The samples service 402 may provide a list of the samples 424 to a client application 404. The list of the samples 424 may include uniform resource locators (URL) of the static data 426 associated with the samples 422. The client application 404 may be allowed to retrieve the static data 426 using the URLs while retrieving the samples 422. In addition, the samples service 402 may provide an unrestricted read-only access to the static data 426. The unrestricted read-only access may be provided because the client application 404 may not need an authentication to access the static data 426.

According to some embodiments, in response to an interference that prevents an access to the static data 426 by the client application 404, a dynamically computed data of the samples 422 may be generated. The dynamically computed data may be gathered with a retrieval of the samples 422 from the content provider 406. The dynamically computed data may provide an alternative access to the samples 422. In addition, the samples service 402 may request the client application 404 to authenticate in response to a determination that the samples 422 have a restricted access.

The example scenarios and schemas in FIGS. 2 and 4 are shown with specific components, data types, and configurations. Embodiments are not limited to systems according to these example configurations. Providing accelerated application authentication and content delivery may be implemented in configurations employing fewer or additional components in applications and user interfaces. Furthermore, the example schema and components shown in FIGS. 2 and 4 and their subcomponents may be implemented in a similar manner with other values using the principles described herein.

Figure 5:
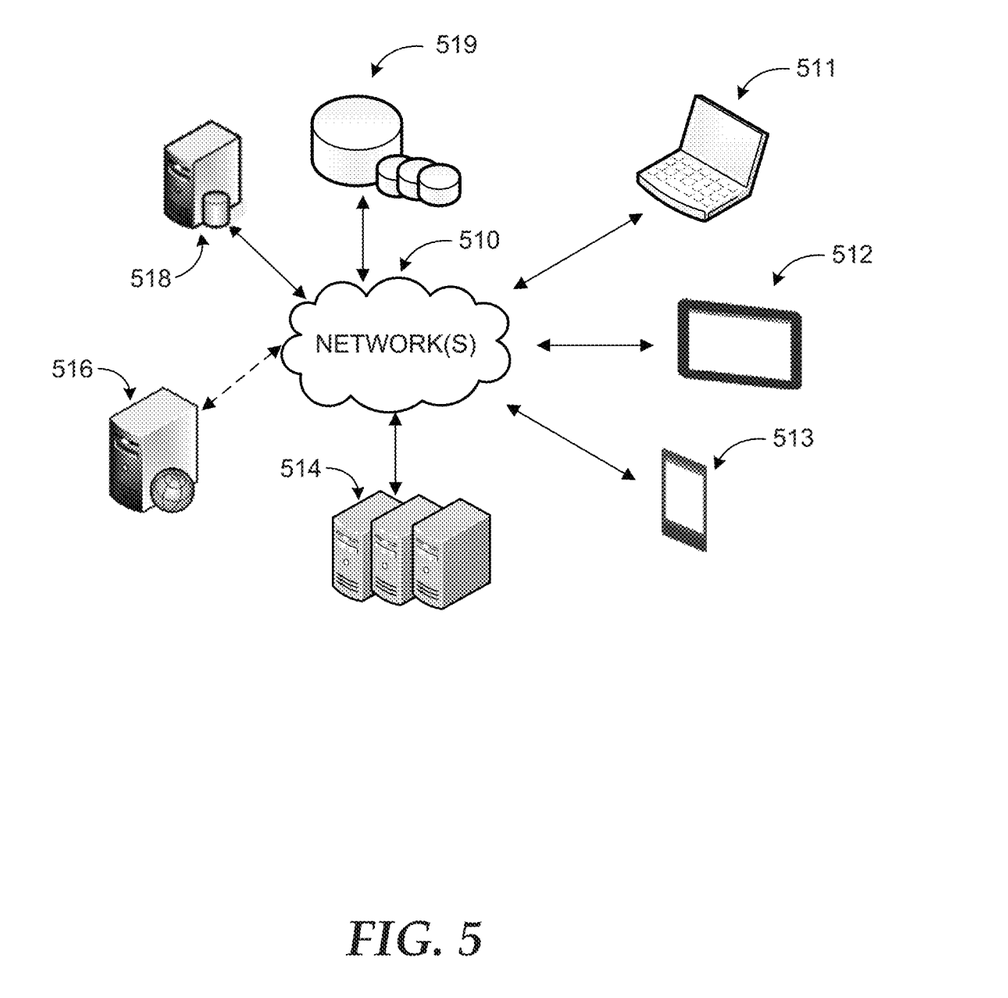
FIG. 5 is a simplified networked environment, where a system according to embodiments may be implemented.

FIG. 5 is an example networked environment, where embodiments may be implemented. A samples service configured to provide accelerated application authentication and content delivery may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A samples service may exchange a proof of identity of a client application with credentials to allow the client application to authenticate to a content provider. The samples service may customize content requested by the client application based on a contextual information of the client application. The samples service may store static data associated with the content in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide accelerated application authentication and content delivery. Furthermore, the networked environments discussed in FIG. 5 are for illustration purposes only. Embodiments are not limited to the example applications, modules, or processes.

Figure 6:
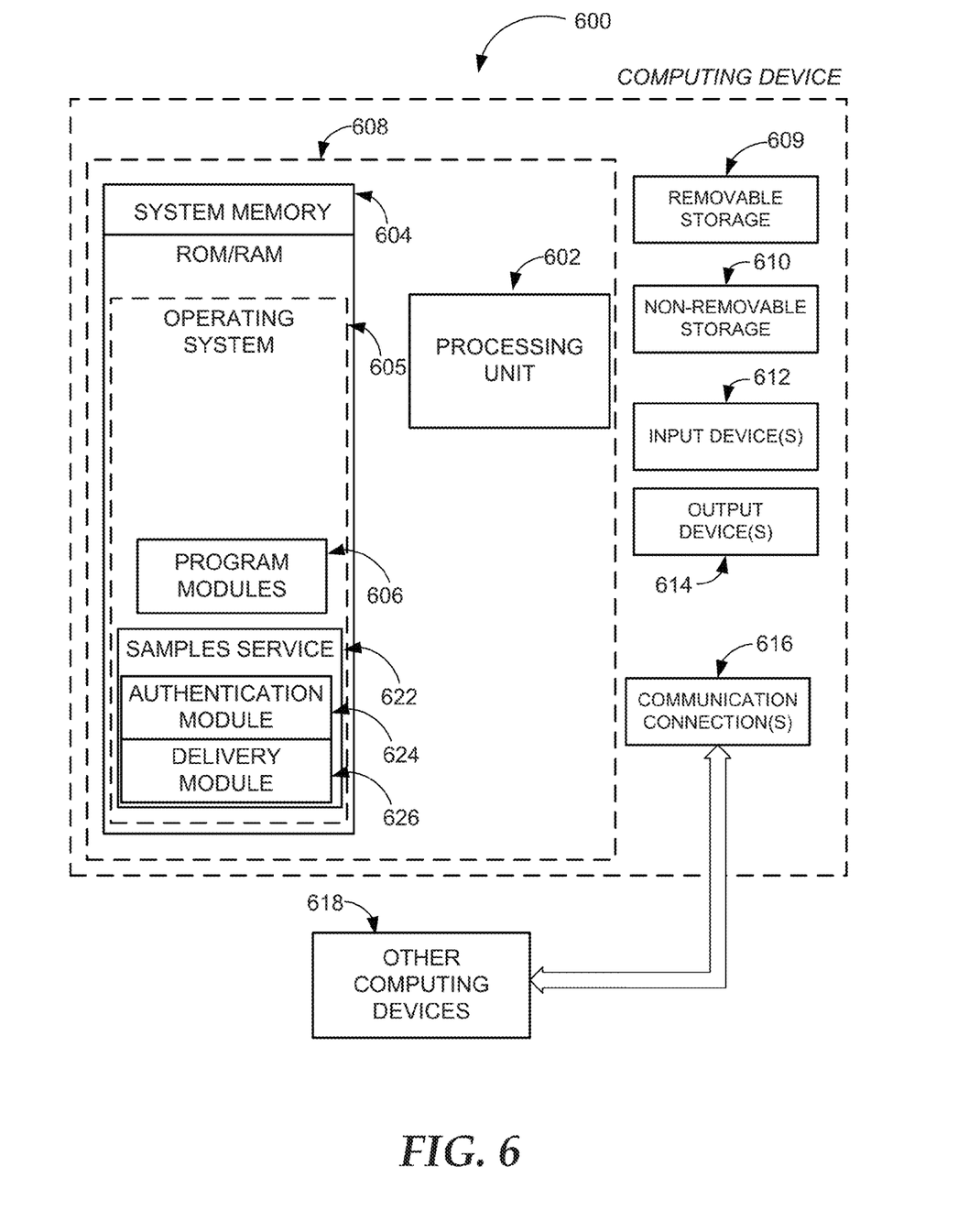
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing a samples service 622 and associated services such as the STS according to embodiments and include at least one processing unit 602 and system memory 604.

Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, the samples service 622, and an authentication module 624 and a delivery module.

The samples service may provide authentication and content delivery functions in association with a content provider. The authentication module 624 may exchange a proof of identity of a client application with credentials to authenticate the client application to the content provider. The deliver module 626 may manage operations associated with deliver of content from the content provider. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
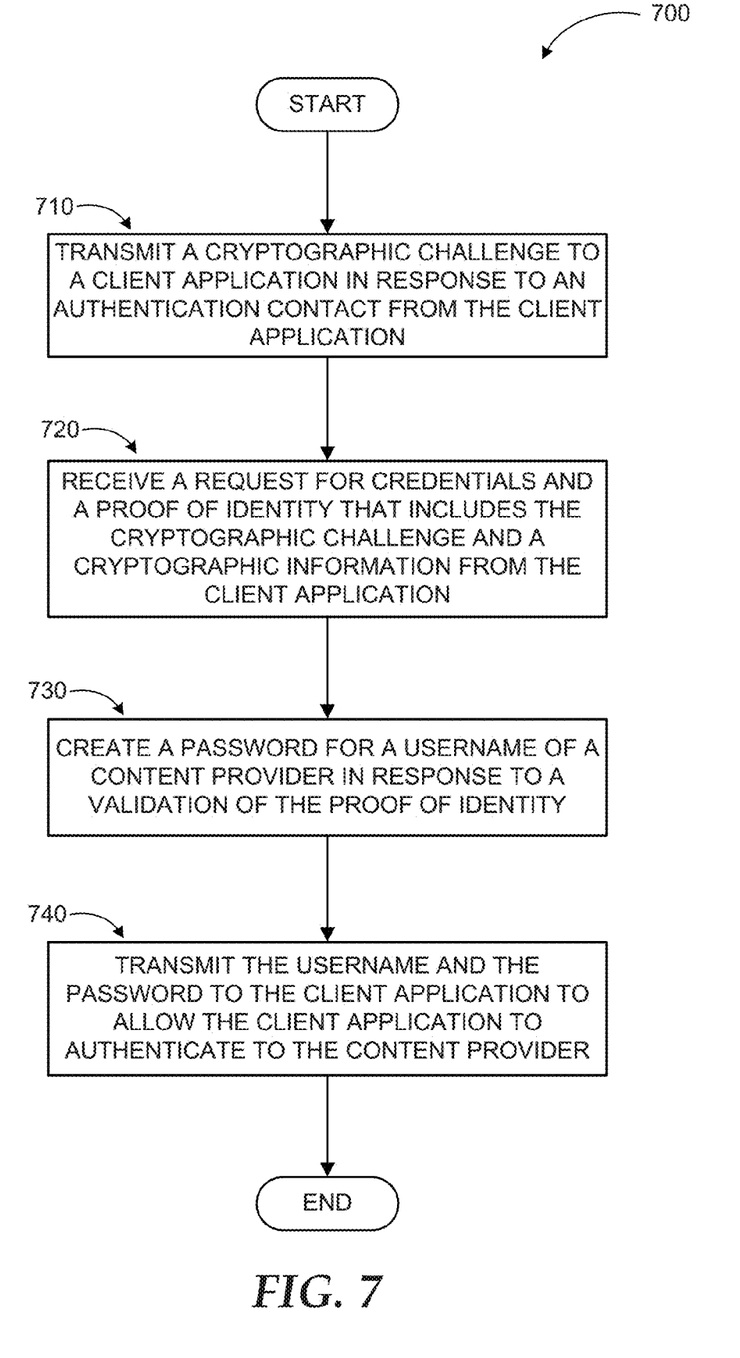
FIG. 7 illustrates a logic flow diagram for a process to provide accelerated application authentication and content delivery, according to embodiments.

FIG. 7 illustrates a logic flow diagram for a process to provide accelerated application authentication and content delivery, according to embodiments. Process 700 may be implemented on a samples service.

Process 700 begins with operation 710, where a cryptographic challenge may be transmitted to a client application, in response to an authentication contact from the client application. At operation 720, a request may be received for credentials and a proof of identity that includes the cryptographic challenge and a cryptographic information from the client application. Next, a password for a username of a content provider may be created, in response to a validation of the proof of identity, at operation 730. At operation 740, the username and the password may be transmitted as the credentials to the client application to allow the client application to authenticate to the content provider.

The operations included in process 700 are for illustration purposes. A samples service according to embodiments may be implemented by similar processes with fewer or additional steps, as well as in different order of operations using the principles described herein.

According to some examples, a method that is executed on a computing device to provide accelerated application authentication and content delivery may be described. The method may include transmitting a cryptographic challenge to a client application, in response to an authentication contact from the client application, receiving a request for credentials and a proof of identity that includes the cryptographic challenge and a cryptographic information from the client application, creating a password for a username of a content provider, in response to a validation of the proof of identity, and transmitting the username and the password to the client application to allow the client application to authenticate to the content provider.

According to other examples, the password may be stored in a table maintained by a trusted cloud host. The method may further include intercepting a login attempt by the client application to authenticate to the content provider, where the login attempt includes the username and the password, redirecting the login attempt to a security token service (STS), receiving a request security token (RST) from the client application at the STS along with the login attempt, validating the password, removing the password from a table maintained by a trusted cloud host to invalidate a subsequent use of the password, and transmitting a request security token response (RSTR) to the client application to allow the client application to authenticate to the content provider.

According to further examples, a content request may be received for content from the client application along with the proof of identity. The content request may be determined to include a version of the client application and a content history of previous samples consumed by the client application, where the samples include documents consumed by the client application. In response to the validation of the proof of identity, a set of samples of the content may be selected to deliver to the client application. Selecting the set of samples may include combining one or more from a set of: a version of the client application, a content history of previous samples consumed by the client application, a configuration information associated with the client application, and a historic information associated with the client application as a contextual information of the client application that is used to determine the set of samples. Selecting the set of samples may include analyzing a contextual information of the client application including one or more from a set of: a product type of the client application, a version of the client application, a geo-location of the client application, and one or more resource loads associated with the content provider to determine the set of samples. The set of samples may be delivered to the client application. A list of the set of samples may be constructed and the list may be stored at the client application to allow the client application to download additional information associated with the set of samples.

According to some examples, a server to provide accelerated application authentication and content delivery may be described. The server may include a memory, a processor coupled to the memory. The processor may be configured to execute a samples service in conjunction with instructions stored in the memory. The samples service may be configured to transmit a cryptographic challenge to a client application, in response to an authentication contact from the client application, receive a request for content, credentials, and a proof of identity that includes the cryptographic challenge and a cryptographic information from the client application, in response to a validation of the proof of identity, create a password for a username of a content provider, select a set of samples of the content from the content provider to deliver to the client application, where the set of samples include documents, store the password in a table maintained by a trusted cloud host, transmit the username and the password to the client application to allow the client application to authenticate to the content provider, and deliver the set of samples to the client application.

According to other examples, the samples service may be further configured to capture static data from the set of samples, where the static data includes one or more from a set of: one or more thumbnail images of the documents associated with the set of samples, elements of the documents, and metadata that describe internal structures of the documents and store the static data in the trusted cloud host. A list of the set of samples may be provided to the client application, where the list includes one or more uniform resource locators (URL) of the static data associated with the set of samples. An unrestricted read-only access to the static data may be provided. In response to an interference that prevents an access to the static data by the client application, a dynamically computed data of the set of samples may be generated to provide an alternative access to the set of samples for the client application. The client application may be requested to authenticate, in response to a determination that the set of samples have a restricted access.

According to some examples, a computer-readable non-transitory storage medium with instructions stored thereon to provide accelerated application authentication and content delivery may be provided. The instructions may include actions that are similar to the method described above.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide accelerated application authentication and content delivery, the method comprising:

transmitting a cryptographic challenge to a client application, in response to an authentication contact from the client application;

receiving a request for credentials and a proof of identity that includes the cryptographic challenge and a cryptographic information from the client application;

creating a password for a username of a content provider, in response to a validation of the proof of identity;

transmitting the username and the password to the client application to allow the client application to authenticate to the content provider;

intercepting a login attempt by the client application to authenticate to the content provider, wherein the login attempt includes the username and the password;

redirecting the login attempt along with a request security token (RST) to a security token service (STS);

receiving a validation of the password from the STS;

removing the password from a table maintained by a trusted cloud host to invalidate a subsequent use of the password; and transmitting a request security token response (RSTR) to the client application to allow the client application to authenticate to the content provider such that the content provider is enabled to receive the RSTR and a content request for content from the client application, authenticate the client application using the RSTR, and provide the content to the client application upon authentication.

2. The method of claim 1, further comprising:
storing the password in the table maintained by the trusted cloud host upon creation.

3. The method of claim 1, further comprising:
receiving the content request for content from the client application along with the proof of identity.

4. The method of claim 3, further comprising:
determining the content request to include a version of the client application and a content history of previous samples consumed by the client application, wherein the samples include documents consumed by the client application.

5. The method of claim 3, further comprising:
in response to the validation of the proof of identity, selecting a set of samples of the content to deliver to the client application.

6. The method of claim 5, wherein selecting the set of samples comprises:
combining one or more from a set of: a version of the client application, a content history of previous samples consumed by the client application, a configuration information associated with the client application, and a historic information associated with the client application as a contextual information of the client application that is used to determine the set of samples.

7. The method of claim 5, wherein selecting the set of samples comprises:
analyzing a contextual information of the client application including one or more from a set of: a product type of the client application, a version of the client application, a geo-location of the client application, and one or more resource loads associated with the content provider to determine the set of samples.

8. The method of claim 5, further comprising:
delivering the set of samples to the client application.

9. The method of claim 5, further comprising:
constructing a list of the set of samples; and
storing the list at the client application to allow the client application to download additional information associated with the set of samples.

10. A server to provide accelerated application authentication and content delivery, the server comprising:
a memory;
a processor coupled to the memory, the processor executing a samples service in conjunction with instructions stored in the memory, wherein the samples service is configured to:
transmit a cryptographic challenge to a client application, in response to an authentication contact from the client application;
receive a request for content, credentials, and a proof of identity that includes the cryptographic challenge and a cryptographic information from the client application;
in response to a validation of the proof of identity,
create a password for a username of a content provider; and
select a set of samples of the content from the content provider to deliver to the client application, wherein the set of samples include documents;
store the password in a table maintained by a trusted cloud host;
transmit the username and the password to the client application to allow the client application to authenticate to the content provider;
deliver the set of samples to the client application;
intercept a login attempt by the client application to authenticate to the content provider, wherein the login attempt includes the username and the password;
redirect the login attempt along with a request security token (RST) to a security token service (STS);
receive a validation of the password from the STS;
remove the password from the table maintained by the trusted cloud host to invalidate a subsequent use of the password; and
transmit a request security token response (RSTR) to the client application to allow the client application to authenticate to the content provider such that the content provider is enabled to receive the RSTR and a content request for content from the client application, authenticate the client application using the RSTR, and provide the content to the client application upon authentication.

11. The server of claim 10, wherein the samples service is further configured to:
capture static data from the set of samples, wherein the static data includes one or more from a set of: one or more thumbnail images of the documents associated with the set of samples, elements of the documents, and metadata that describe internal structures of the documents; and
store the static data in the trusted cloud host.

12. The server of claim 11, wherein the samples service is further configured to:
provide a list of the set of samples to the client application, wherein the list includes one or more identifiers of the static data associated with the set of samples.

13. The server of claim 12, wherein the samples service is further configured to:
provide an unrestricted read-only access to the static data.

14. The server of claim 12, wherein the samples service is further configured to:
in response to an interference that prevents an access to the static data by the client application, generate a dynamically computed data of the set of samples to provide an alternative access to the set of samples for the client application.

15. The server of claim 12, wherein the samples service is further configured to:
request the client application to authenticate, in response to a determination that the set of samples have a restricted access.

16. A computer-readable memory device with instructions stored thereon to provide accelerated application authentication and content delivery, the instructions comprising:
transmitting a cryptographic challenge to a client application, in response to an authentication contact from the client application;
receiving a request for content, credentials, and a proof of identity that includes the cryptographic challenge and a cryptographic information from the client application;
in response to a validation of the proof of identity,
creating a password for a username of a content provider; and
selecting a set of samples of the content from the content provider to deliver to the client application, wherein the set of samples include documents;

storing the password in a table maintained by a trusted cloud host;

transmitting the username and the password to the client application to allow the client application to authenticate to the content provider;

delivering the set of samples to the client application;

intercepting a login attempt by the client application to authenticate to the content provider, wherein the login attempt includes the username and the password;

redirecting the login attempt along with a request security token (RST) to a security token service (STS);

receiving a validation of the password from the STS;

removing the password from the table maintained by the trusted cloud host to invalidate a subsequent use of the password; and transmitting a request security token response (RSTR) to the client application to allow the client application to authenticate to the content provider such that the content provider is enabled to receive the RSTR and a content request for content from the client application, authenticate the client application using the RSTR, and provide the content to the client application upon authentication.

17. The computer-readable memory device of claim 16, wherein the instructions further comprise:

capturing static data from the set of samples, wherein the static data includes one or more from a set of: one or more thumbnail images of the documents associated with the set of samples, elements of the documents, and metadata that describe internal structures of the documents;

storing the static data in the trusted cloud host; and providing a list of the set of samples to the client application, wherein the list includes one or more uniform resource locators (URL) of the static data associated with the set of samples.

* * * * *